US006807828B2

(12) United States Patent
Voisine et al.

(10) Patent No.: US 6,807,828 B2
(45) Date of Patent: Oct. 26, 2004

(54) I.S. GLASS FORMING MACHINE

(75) Inventors: Gary R. Voisine, E. Hartford, CT (US); Michael P. Ciriello, Prospect, CT (US)

(73) Assignee: Emhart Glass S.A., Cham (CH)

( * ) Notice: Subject to any disclaimer, the term of this patent is extended or adjusted under 35 U.S.C. 154(b) by 484 days.

(21) Appl. No.: 10/027,560

(22) Filed: Dec. 19, 2001

(65) Prior Publication Data

US 2003/0110806 A1 Jun. 19, 2003

(51) Int. Cl.[7] .............................................. C03B 9/353
(52) U.S. Cl. ............................. 65/171; 65/323; 65/361; 425/182; 425/451
(58) Field of Search ........................... 65/171, 172, 173, 65/323, 361; 425/451, 451.5, 451.7, 451.9, 182

(56) References Cited

U.S. PATENT DOCUMENTS

| 3,278,290 A | * | 10/1966 | Rowe | 65/323 |
|---|---|---|---|---|
| 3,472,639 A | * | 10/1969 | Mumford | 65/307 |
| 3,607,207 A | * | 9/1971 | Dahms et al. | 65/307 |
| 4,449,996 A | * | 5/1984 | Irwin et al. | 65/305 |
| 4,826,524 A | * | 5/1989 | Foster | 65/323 |
| 4,853,023 A | * | 8/1989 | Bolin | 65/323 |
| 4,861,365 A | * | 8/1989 | Zsifkovits | 65/323 |
| 4,878,935 A | * | 11/1989 | Zsifkovits | 65/323 |
| 4,969,945 A | * | 11/1990 | Mehling et al. | 65/323 |
| 5,928,400 A | * | 7/1999 | Meyer et al. | 65/172 |
| 6,109,063 A | * | 8/2000 | Ciriello et al. | 65/323 |
| 6,318,129 B1 | * | 11/2001 | Fenton et al. | 65/171 |

* cited by examiner

Primary Examiner—Sean Vincent
(74) Attorney, Agent, or Firm—Spencer T. Smith

(57) ABSTRACT

A mold open and close mechanism for an I.S. machine is provided which separates the drive including the motor and the housing. The drive portion is releasably connected to the housing so that the drive can be easily removed for repair or replacement.

3 Claims, 5 Drawing Sheets

I.S. GLASS FORMING MACHINE

The present invention relates to I.S. glass container forming machines and more particularly to the mold open and close mechanisms of such machines.

BACKGROUND OF THE INVENTION

In an I.S. machine a gob of molten glass is formed into a parison within a blank mold and the formed parison is transferred to a blow station where the parison is blown within a blow mold into a formed bottle. The blow molds and the blank molds are part of a mold open and close mechanism such as disclosed in U.S. Pat. No. 5,830,254.

In that design, a mold carrier is connected to a pair of links via a horizontal rotatable shaft. The links are part of a drive assembly. The removal of the shaft permits the separation of the mold carrier from the drive assembly. The entire drive assembly, including the drive assembly housing, could then be removed by loosening bolts which secured the drive assembly housing to the top surface of the frame and pulling the housing, with the housed drive assembly, upwardly lifting the motor of the drive assembly up through a hole in the section frame. In this design, the link bearings were hard to maintain.

OBJECT OF THE INVENTION

It is an object of the present invention to provide an I.S. glass container forming machine in which the mold carrier and drive assembly can be more easily removed and the link bearings will be easier to maintain.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE PREFERRED EMBODIMENT

Figure 1:
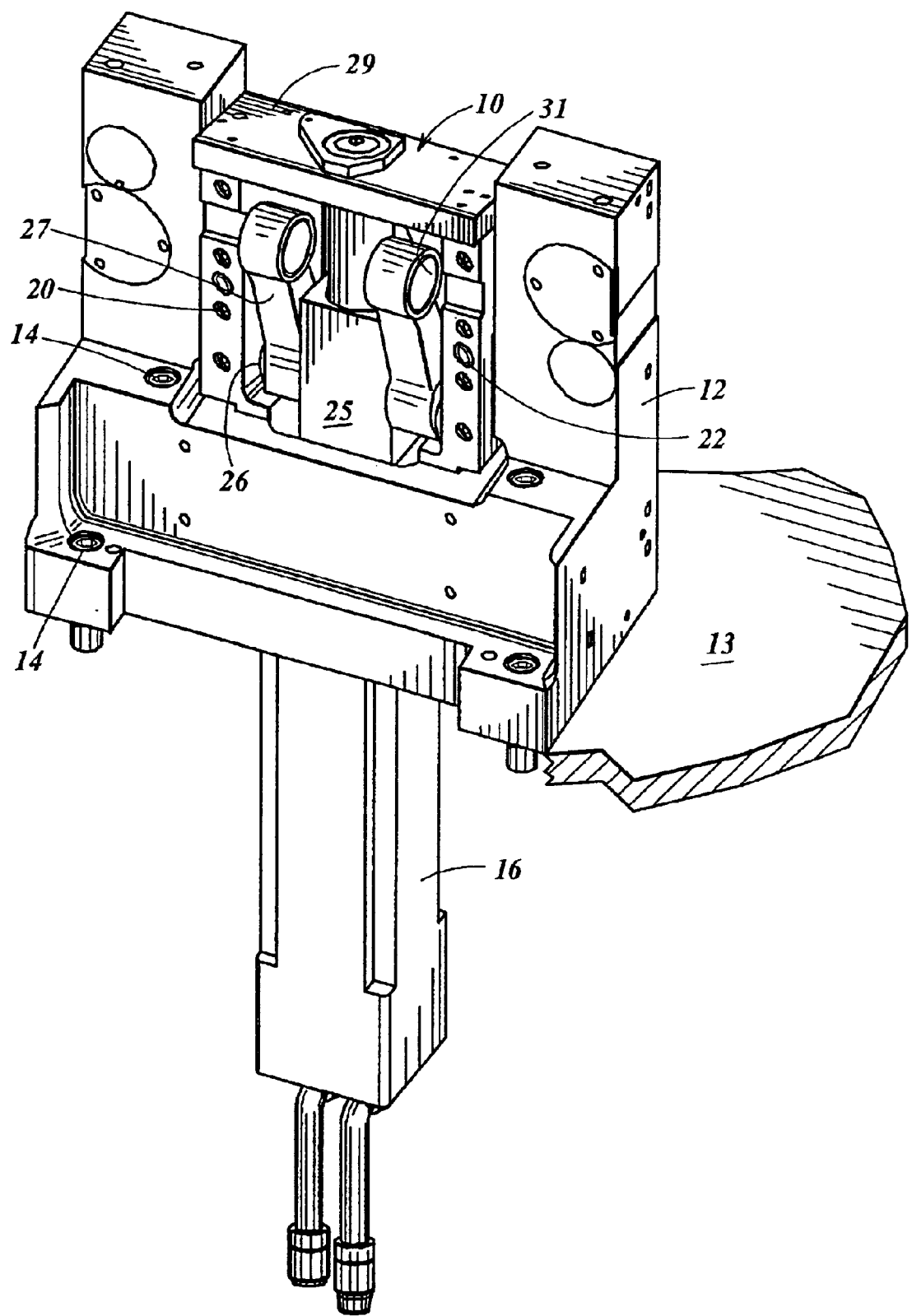
FIG. 1 is an oblique view of a mold open and close mechanism of an I.S. (individual section) machine.
Figure 2:
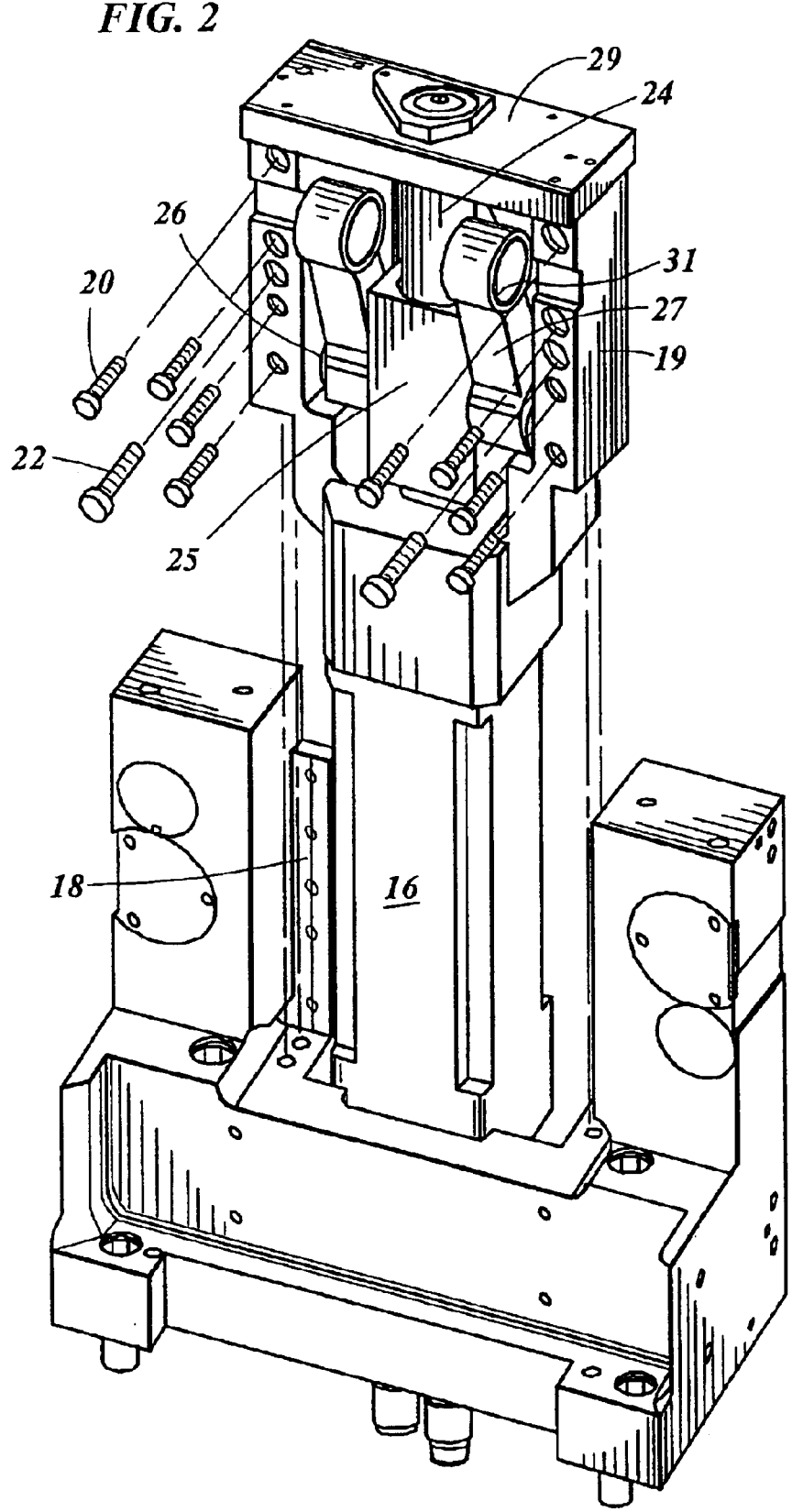
FIG. 2 is a view similar to that of FIG. 1 with the insert assembly being separated from the actuator housing.
Figure 3:
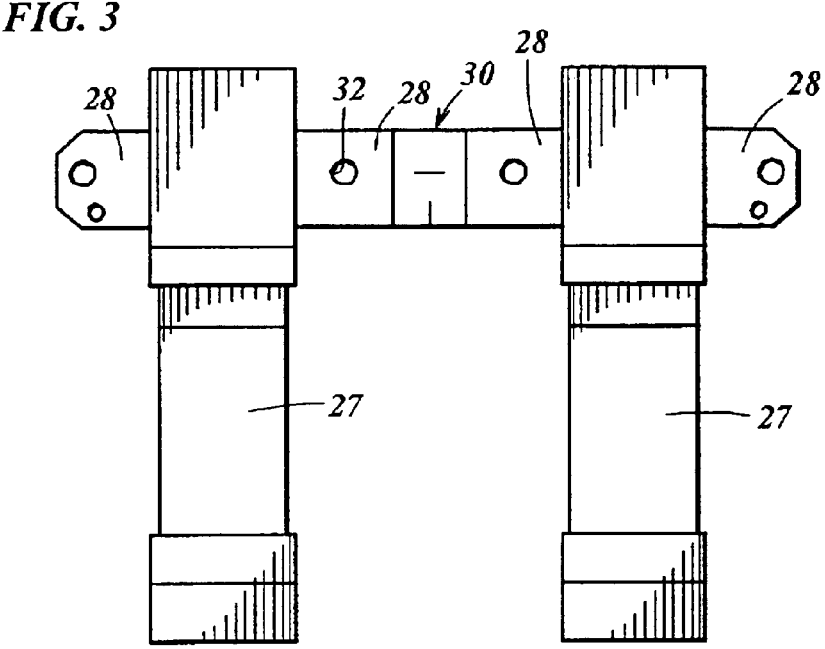
FIG. 3 is an elevational view showing a shaft supported by a pair of drive links of the insert assembly.
Figure 5:
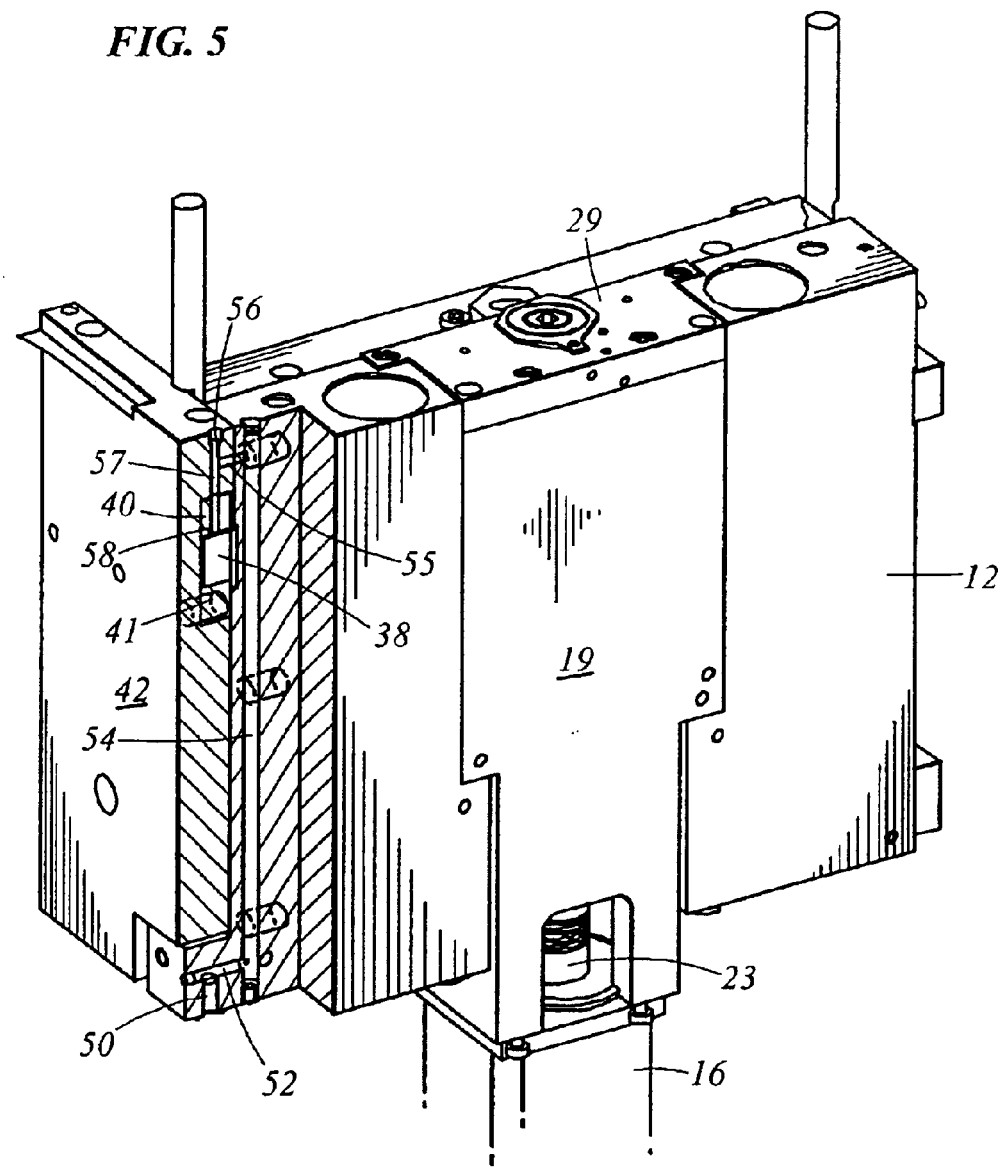
FIG. 5 is an oblique view of the mold open and close mechanism and a side frame.
Figure 6:
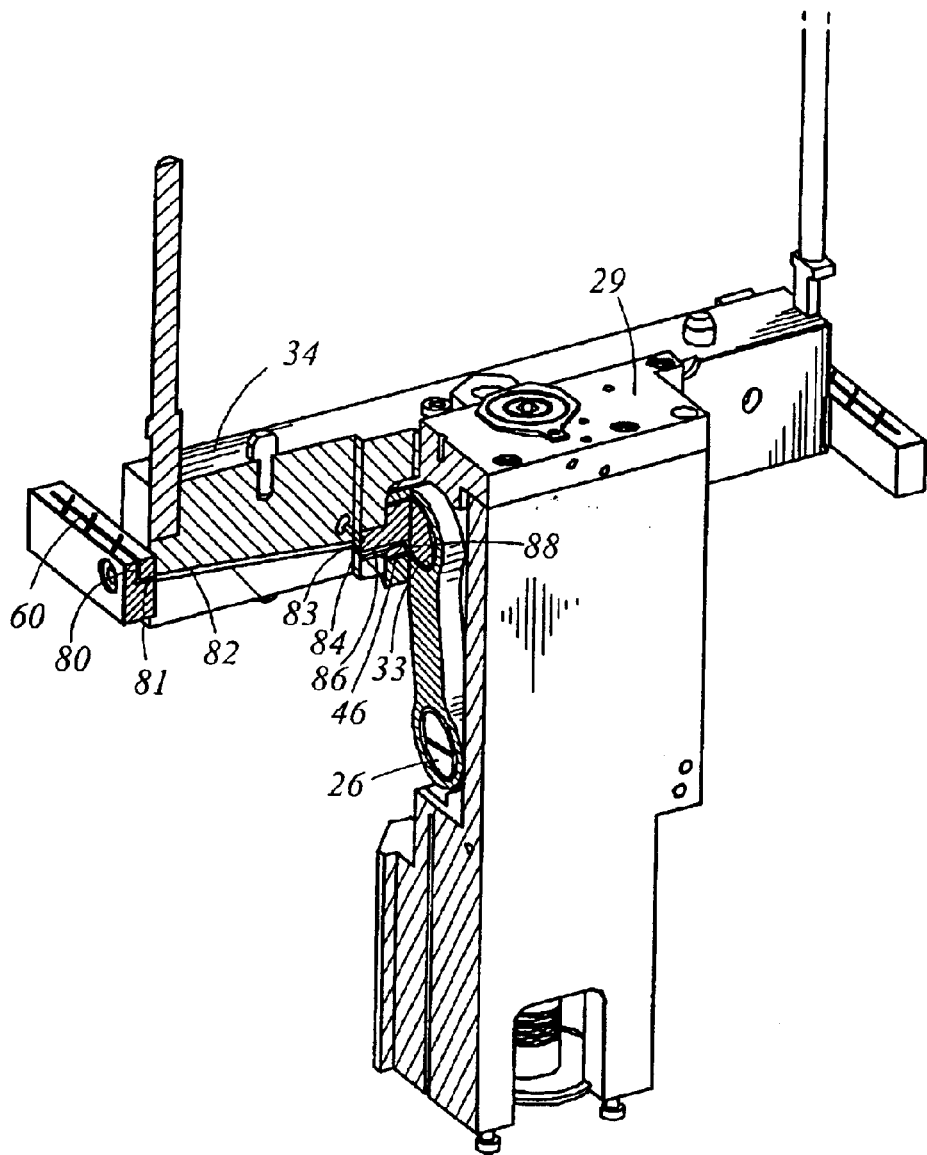
FIG. 6 is an oblique view, partly in section, of the insert assembly and a supported mold carrier assembly.

FIG. 1 discloses an insert assembly 10 and an actuator housing 12. The actuator housing is mounted on the top wall 13 of a section frame via suitable bolts 14. The top wall has a hole (not shown) through which the motor 16 of the insert assembly 10 can pass. As can be seen from FIG. 2, the actuator housing has a pair of vertically extending flanges 18 (one shown) to which the insert assembly housing 19 is secured with suitable bolts 20. Dowel pins 22 assure proper location. Secured to the insert assembly housing 19 are the motor 16 and a ball screw 24 which extends between a top plate 29 and a motor coupling 23 (FIG. 5). Associated with the ball screw is a nut 25 to which pins 26 are secured for pivotally supporting one end of a pair of drive links 27. A shaft 30 (FIG. 3) has a pair of cylindrical bearing surfaces 33 (FIG. 6) to be received by the link holes 31 and has flat portions 28 at either side of the bearing surfaces 33. Threaded holes 32 are defined in these flat portions.

Figure 4:
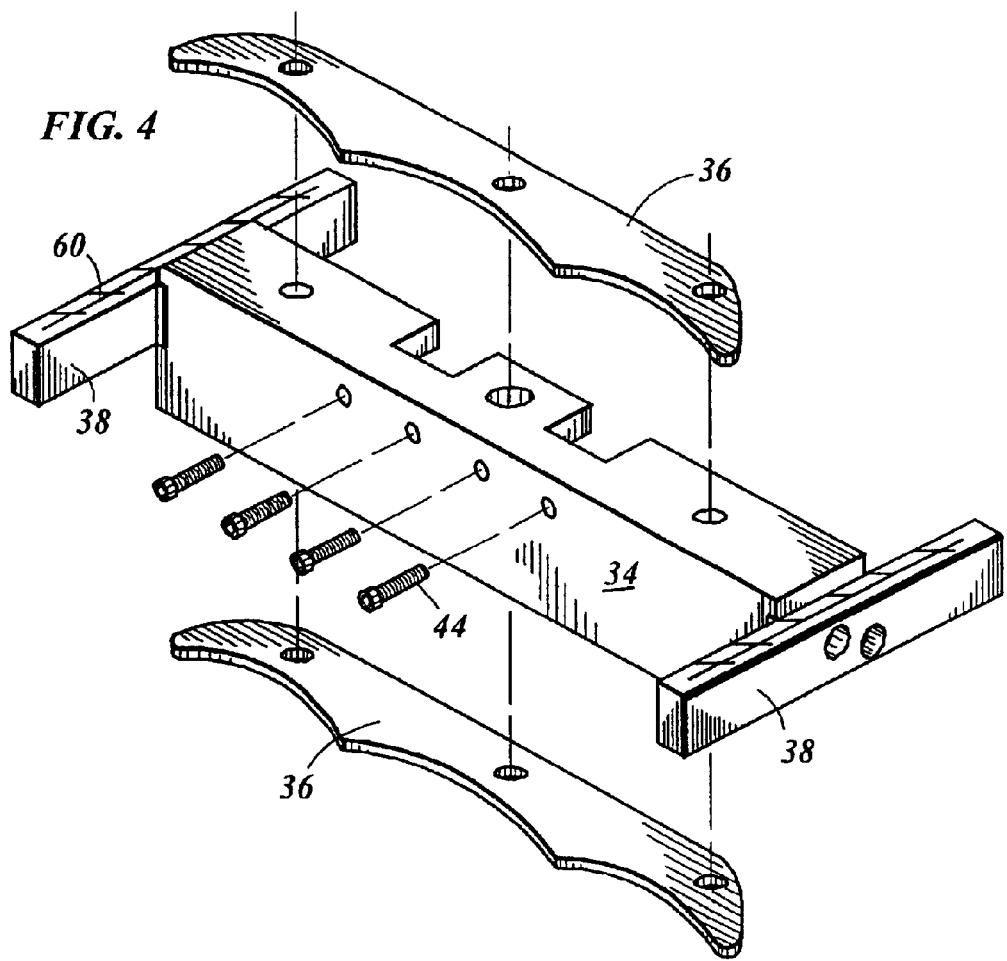
FIG. 4 is an exploded oblique view of the supported mold carrier assembly.

Operatively associated with this shaft 30 is a mold support mechanism (FIG. 4) which has a mold carrier 34 to which upper and lower inserts 36 are secured. Also secured to the mold carrier are an opposed pair of rails 38 (the moveable rails) which are slidingly displaceable between upper 40 and lower 41 fixed rails (one pair shown) which are removably secured to a side frame 42. The rails have a length selected so that when the opposed mold open and close mechanism is fully retracted, the mold support movable rail can be pulled free from the fixed rails thereby permitting the release of the mold carrier from the machine with the removal of the bolts which extend through suitable holes in the mold carrier 34 into the threaded holes 32 in the shaft 30 so that the mold support mechanism can be repaired or replaced.

The holes 31 of the link pair remote from the nut 25 are defined by a bearing 46. To achieve lubrication of this bearing lubricating oil is supplied to an inlet 50 in the actuator housing 12 (FIG. 5) which, via a branch 52 supplies a vertical conduit 54. A top horizontal branch 55 communicates with a corresponding branch 56 in the side frame 42 and this branch connects with a vertical conduit 57 in the frame which communicates with a vertical feed hole 58 in the upper fixed rail 40. Oil will be periodically pulsed through this feed conduit onto the top surface of the movable rail 38 (there will always be a portion of the movable rail beneath feed hole 58). The oil collects in a series of grooves 60 cut into the top surface of the movable rail which defines a small oil reservoir. This provides lubrication of the top surface and oil that drips over the top surface lubricates the top surface of the lower fixed rail. Communicating with this reservoir is a vertical inlet conduit 80 (FIG. 6) which connects to a horizontal inlet conduit 81. Oil proceeds by gravity to an inclined conduit 82 in the carrier and then through a transverse hole 83 into a coaxial hole 84 in the shaft 30 to a horizontal feed conduit 86 to a vertical outlet conduit 88 which communicates with the surface of the supporting bearing midway along its length.

What is claimed is:

1. A mold open and close mechanism to be secured to the top wall of an I.S. machine, the top wall having an opening therein, comprising an actuator housing to be secured to the top wall,
a vertically extending insert assembly including
 a housing, and
 a drive mounted on said housing, said drive including a nut supporting drive link means, and means including a vertically positioned motor for displacing said nut,
said actuator housing defining a vertically extending housing opening above the top wall opening so that said vertically extending insert assembly can be inserted through the housing opening and into the top wall opening, said actuator housing including vertically extending flange means, said insert assembly housing including mounting means for engaging said flange means and fastener means for securing said mounting means to said flange means whereby with the release of said fastener means said insert assembly can be lifted from the machine.

2. A mold open and close mechanism according to claim 1, wherein said means including a vertically positioned motor for displacing said nut further includes a screw operatively associated with said nut and a coupling for connecting said screw and said motor.

3. A mold open and close mechanism according to claim 1, wherein said drive link means comprises a pair of links.

* * * * *